(12) United States Patent
Letchford

(10) Patent No.: US 6,706,821 B1
(45) Date of Patent: Mar. 16, 2004

(54) MICHAEL ADDITION PRODUCTS OF AMINE TERMINATED POLYOLEFINS AND POLYFUNCTIONAL ACRYLATES

(75) Inventor: Robert J. Letchford, Cherryville, NC (US)

(73) Assignee: FMC Corporation, Philadelphia, PA (US)

( * ) Notice: Subject to any disclaimer, the term of this patent is extended or adjusted under 35 U.S.C. 154(b) by 0 days.

(21) Appl. No.: 09/908,485

(22) Filed: Jul. 18, 2001

Related U.S. Application Data

(60) Provisional application No. 60/218,911, filed on Jul. 18, 2000.

(51) Int. Cl.$^7$ ............................................... C08G 61/00
(52) U.S. Cl. ........................ 525/302; 525/310; 525/313
(58) Field of Search ................................ 525/302, 310, 525/313; 528/288

(56) References Cited

U.S. PATENT DOCUMENTS

| | | |
|---|---|---|
| 5,109,040 A | 4/1992 | Hönig et al. |
| 5,393,843 A | 2/1995 | Handlin, Jr. et al. |
| 5,405,911 A | 4/1995 | Handlin, Jr. et al. |
| 5,523,364 A | 6/1996 | Engel et al. |
| 5,527,753 A | 6/1996 | Engel et al. |
| 5,550,203 A | 8/1996 | Engel et al. |
| 5,587,433 A | 12/1996 | Boeckeler |
| 5,605,872 A | 2/1997 | Engel et al. |
| 5,739,192 A | 4/1998 | Blizzard et al. |
| 5,840,428 A | 11/1998 | Blizzard et al. |
| 5,910,547 A | 6/1999 | Schwindeman et al. |
| 5,965,681 A | 10/1999 | Schwindeman et al. |
| 6,121,474 A | 9/2000 | Schwindeman et al. |
| 6,197,891 B1 | 3/2001 | Schwindeman et al. |

FOREIGN PATENT DOCUMENTS

| | | | |
|---|---|---|---|
| GB | 2011913 | * | 7/1979 |

OTHER PUBLICATIONS

Burak; "UV Cured Coatings Double Feature—New hydrophobic oligomers offer both chemical and water resistance in free radical cure applications," *Modern Paint Coatings*, Nov., 1999, pp. 30–34.

Sartomer Application Bulletin; "New Developments in Oligomers for Ultraviolet Curable PSA Applications," Feb., 2000.

* cited by examiner

*Primary Examiner*—Jeffrey Mullis
(74) *Attorney, Agent, or Firm*—Myers Bigel Sibley & Sajovec, PA

(57) ABSTRACT

Adducts of polyfunctional acrylates and amine terminated polyolefins are provided. The adducts are prepared via a Michael addition reaction of the acrylate and the amine terminated polyolefin. The resultant adducts can be further polymerized with acrylic monomers via free radical or radiation curing mechanisms or quaternized to improve dispersion in aqueous systems.

12 Claims, No Drawings

MICHAEL ADDITION PRODUCTS OF AMINE TERMINATED POLYOLEFINS AND POLYFUNCTIONAL ACRYLATES

CROSS-REFERENCE TO RELATED APPLICATIONS

This application is related to copending provisional Application Serial No. 60/218,911 filed Jul. 18, 2000, the entire disclosure of which is hereby incorporated by reference, and claims the benefit of its earlier filing date under 35 USC 119(e).

FIELD OF THE INVENTION

The present invention relates to compounds having terminal acrylic functionality, and more particularly to acrylic functionalized polymers having a hydrophobic hydrocarbon backbone.

BACKGROUND OF THE INVENTION

Acrylic based resins are widely used in a variety of applications, including coatings, sealants, adhesives, and the like. Generally such resins are defined as thermoplastic polymers or copolymers derived from acrylic acid, methacrylic acid, esters of these acids or acrylonitrile. The monomers polymerize readily in the presence of radiation, typically ultraviolet light, or e-beam radiation, or thermal energy.

For example, radiation curable acrylic systems can be coated onto a substrate and the coated substrate passed under a commercially available UV or excimer lamp on a conveyer moving at predetermined speeds. The substrate can be, for example, metal, wood, mineral, glass, paper, plastic, fabric, ceramic, and the like. Radiation curable systems are increasingly attractive in view of environmental concerns associated with the release of volatile organic compounds (VOCs) which can result from the use of solvent-based systems, as well as energy costs associated with curing solvent based systems.

Despite the benefits associated with acrylic based systems, there are problems with existing products. For example, the market for radiation cured coatings applied to nonporous substrates such as plastics is increasing. However, adhesion to such surfaces can be difficult because unlike metal substrates, where a chemical as well as a physical bond can occur, plastic substrates have only a physical bond present. In addition, acrylic resins are polar in nature and thus may not be readily used in applications requiring hydrophobicity, among other properties.

U.S. Pat. No. 5,587,433 to Boeckler is directed to the preparation of esters of hydroxy terminated polybutadiene compositions. The esters are prepared by reacting a hydroxy terminated polybutadiene with an anhydride to form a carboxyl terminated polybutadiene derivative. This derivative is then reacted with an epoxide, which can be a glycidyl acrylate ester. Alternatively the carboxyl-terminated polybutadiene derivative can be reacted with an excess amount of a diepoxide, such as diglycidyl ethers of Bisphenol A, and the residual epoxide groups subsequently reacted with an α,β-unsaturated carboxylic acid, such as acrylic or methacrylic acid. In yet another alternative embodiment, the carboxyl-terminated polybutadiene derivative can be reacted in excess with diepoxide and the residual carboxy groups subsequently reacted with a glycidyl acrylate ester. See also Modern Paints & Coatings, November 1999, pages 30–34. While these resins can offer desirable properties, the resultant oligomers exhibit relatively poor thermal oxidative stability.

U.S. Pat. No. 5,393,843 to Handlin, Jr. et al. is directed to hydrogenated butadiene polymers having terminal functional groups. The polymers are stated to have 1,2 addition microstructure between 30% and 70%, which in turn is stated to result in polymers having lower viscosities as compared to similar polymers having either higher or lower amounts of 1,2-addition. Generally the polymers are prepared using lithium initiators to polymerize one or more conjugated dienes, such as butadiene, in the presence of a structure modifier to achieve the desired percentage of 1,2-addition. Examples 1–5 describe preparing linear hydrogenated butadiene polymers having about two terminal hydroxyl groups per molecule using a lithium diinitiator and treating the resultant living polymer with ethylene oxide to functionalize the same. Example 46 is a hypothetical example that describes preparing an acrylate terminated prepolymer from such a hydrogenated polybutadiene diol by reacting the same with isophorone diisocyanate and hydroxyl ethyl acrylate. Although the different isocyanate groups of the isophorone diisocyanate could exhibit some selectivity, it would be expected that the isocyanate groups would also react not only with the diols of the polybutadiene polymer but also with the hydroxyl group of the acrylate as well.

SUMMARY OF THE INVENTION

The present invention is directed to unique compounds having various desirable yet contradictory properties. In particular the invention provides Michael addition adducts of polyfunctional acrylates and amine terminated polyolefins.

Generally the polyfunctional acrylates have the formula:

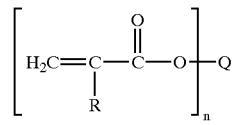

wherein R is hydrogen or methyl, n is $\geq 2$ and Q is an organic group. Q can be any organic group that does not interfere with the Michael addition and can include moieties such as polyethers or polyoxyalkylenes, urethanes, epoxies, polyesters, and isocyanates. Currently preferred polyfunctional acrylates are polyoxyalkylene acrylates, which are optionally ethoxylated or propoxylated.

The amine terminated polyolefins are advantageously prepared via anionic polymerization using lithium initiators, including dilithium initiators and functionalized lithium initiators having a protected amine functionality as known in the art. The resulting living chain end can be functionalized using amine electrophiles. Amine protecting groups, when present, are removed to liberate the amine functionalities.

The amine terminated polyolefins are preferably substantially hydrogenated so that at least about about 70%, or more, of the carbon-carbon double bonds are saturated The inventors have found that the use of hydrogenated amine functionalized polyolefins can provide the benefit of improved thermal oxidative stability and UV stability as compared to acrylate functionalized polymers having unsaturated polyolefin backbones. Further, the presence of the polyolefin chain can provide other useful properties to the resulting adducts, such as elastomeric properties and improved adhesion of the adducts to polyolefin substrates.

The resulting adducts can be generally represented by the formula:

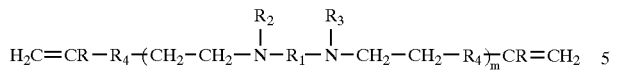

(I)

wherein:
R is hydrogen or methyl, and preferably hydrogen;
$R_1$ is a polyolefin;
$R_2$ and $R_3$ are independently H or substituted or unsubstituted C1–C25 alkyl;
$R_4$ is an organic group derived from a polyfunctional acrylate and optionally includes side groups formed by the reaction of vinyl groups and amine terminated polyolefins; and
m is from 1 to 30. Preferably $R_4$ is —C(O)—Q, wherein Q is an organic group comprising at least one moiety selected from the group consisting of polyethers or polyoxyalkylenes, urethanes, epoxies, polyesters, and isocyanates. One currently preferred adduct is represented by the formula:

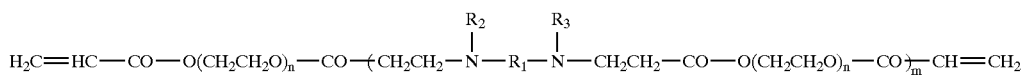

(II)

wherein $R_1$ is hydrogenated polybutadiene or hydrogenated isoprene, having a molecular weight of from about 1000 to about 200,000, m is 1 or 2, and n is 1 to 200.

The present invention also provides methods for making the adducts of the invention. Generally the adducts are prepared via the Michael addition reaction of a molar excess of the polyfunctional acrylate with the amine terminated polyolefin. Stated differently, the adducts can be prepared by reacting m+1 moles of the polyfunctional acrylate with m moles of the amine terminated polyolefin, wherein m is 1 or greater. Such reactions readily occur at or around room temperature (e.g. 20° to 25° C.) but the rate of reaction can be increased at elevated temperatures (e.g. up to about 100° C.). The invention is not so limited, however, and the reaction can be conducted at temperatures outside of these ranges, for example, below room temperatures, even as low as about 0° C. Optionally diluents or solvents such as acetone, benzyl alcohol or other polar solvents, may be present. Reaction times can also vary and generally range from about 0.5 to about 8 hours, although reaction times outside of these ranges may be used. In addition, a base can be used to catalyze the reaction. However, a large molar excess (up to 5x) of one reactant or the other allows the adducting to be done with ease.

The adducts can be used in a variety of applications, such as adhesives, coatings, sealants, and the like. The adducts can also participate in additional downstream reactions. For example, the adducts can be copolymerized with one or more acrylic monomers via free radical or photopolymerization techniques. The adducts are particularly useful as binders in radiation curable compositions, providing clean chemistries at or near zero VOC requirements for coatings, electronics, adhesive, and other low VOC applications. The tertiary amine groups resulting from the Michael addition products can also be quatemized by acidification to improve dispersibility in aqueous systems, such as those used in water-based cathodic electrodeposition coatings.

DETAILED DESCRIPTION OF THE INVENTION

The present invention now will be described more fully in which preferred embodiments of the invention are described. This invention may, however, be embodied in many different forms and should not be construed as limited to the embodiments set forth herein; rather, these embodiments are provided so that this disclosure will be thorough and complete, and will fully convey the scope of the invention to those skilled in the art.

The amine-terminated polyolefins are prepared by methods known to those skilled in the art such as those described in U.S. Pat. No. 5,965,681; U.S. Pat. No. 5,910,547 to Schwindeman et al.; and U.S. patent application Ser. No. 09/256,737, filed Feb. 24, 1999, to Schwindeman et al, now U.S. Pat. No. 6,121,474, issued Sep. 19, 2000, which are all incorporated herein by reference in their entirety. See also U.S. patent application Ser. No. 09/665,528, filed Sep. 19, 2000, to Brockmann et al., which is also incorporated herein by reference in its entirety.

For example, a protected amine functional lithium anionic polymerization initiator, such as described in U.S. Pat. No. 5,910,547, U.S. Pat. No. 6,121,474, and U.S. patent application Ser. No. 09/665,528, referenced above, may be used to polymerize one or more suitable monomer(s) capable of anionic polymerization, including conjugated alkadienes, alkenylsubstituted aromatic hydrocarbons, and mixtures thereof. An exemplary protected amine functionalized initiator has the formula:

wherein:
M is an alkali metal selected from the group consisting of lithium, sodium and potassium;
Z is a branched or straight chain hydrocarbon connecting group which contains 3–25 carbon atoms optionally substituted with aryl or substituted aryl containing lower alkyl, lower alkylthio, or lower dialkylamino groups;
Q is a saturated or unsaturated hydrocarbyl group derived by incorporation of one or more conjugated diene hydrocarbons, one or more alkenylsubstituted aromatic hydrocarbons, or mixtures thereof;
n ranges from 0 to 5, and
$(A-R^1R^2R^3)_2$ is a protecting group in which A is an element selected from Group IVa of the Periodic Table of the Elements; and $R^1$, $R^2$, and $R^3$ are independently selected from the group consisting of hydrogen, alkyl, substituted alkyl, aryl, substituted aryl, cycloalkyl and substituted cycloalkyl or $R^3$ is optionally a —$(CR^7R^8)_1$— group linking two A wherein $R^7$ and $R^8$ are each independently selected from the group consisting of hydrogen, alkyl, substituted alkyl, aryl, substituted aryl, cycloalkyl, and substituted cycloalkyl, and 1 is an integer from 1 to 7. Thus the skilled artisan will appreciate that $R^3$ as used herein includes the group

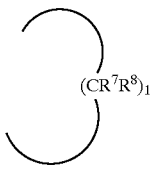

linking two A groups.

Unless otherwise indicated, as used herein, the term "alkyl" refers to straight chain and branched C1–C25 alkyl. The term "substituted alkyl" refers to C1–C25 alkyl substituted with one or more lower C1–C10 alkyl, lower alkoxy, lower alkylthio, or lower dialkylamino. The term "cycloalkyl" refers to C3–C12 cycloalkyl. The term "substituted cycloalkyl" refers to C3–C12 cycloalkyl substituted with one or more lower C1–C10 alkyl, lower alkoxy, lower alkylthio, or lower dialkylamino. The term "aryl" refers to C5–C25 aryl having one or more aromatic rings, each of 5 or 6 carbon atoms. Multiple aryl rings may be fused, as in naphthyl or unfused, as in biphenyl. The term "substituted aryl" refers to C5–C25 aryl substituted with one or more lower C1–C10 alkyl, lower alkoxy, lower alkylthio, or lower dialkylamino. Exemplary aryl and substituted aryl groups include, for example, phenyl, benzyl, and the like.

The resultant living polymer will include a protected amino functional group at one terminus and a living chain end at the other terminus. The living chain end may then be functionalized with an amine functional electrophile. Exemplary amine functional electrophiles include without limitation the protected functional amine electophiles described in the foregoing patents, as well as other amine electrophiles as known in the art. Such functionalizing agents can have the following structure:

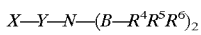

wherein:

X is halogen, preferably chloride, bromide or iodide;

Y is branched or straight chain hydrocarbon connecting groups which contains 1–25 carbon atoms optionally substituted with aryl or substituted aryl containing lower alkyl, lower alkylthio, or lower dialkylamino groups; and $(B-R^4R^5R^6)_2$ is a protecting group in which B is an element selected from Group IVa of the Periodic Table of the Elements; and $R^4$, $R^5$ and $R^6$ are independently selected from the group consisting of hydrogen, alkyl, substituted alkyl, aryl, substituted aryl, cycloalkyl and substituted cycloalkyl or $R^6$ is optionally a —$(CR^7R^8)_1$— group linking two B wherein $R^7$ and $R^8$ are each independently selected from the group consisting of hydrogen, alkyl, substituted alkyl, aryl, substituted aryl, cycloalkyl, and substituted cycloalkyl, and 1 is an integer from 1 to 7. Thus the skilled artisan will appreciate that $R^6$ as used herein includes the group

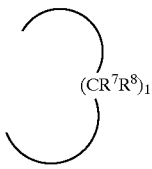

linking two B groups.

The protecting groups, when present, can be removed using techniques known in the art, also as described in the aforementioned references. Residual carbon-carbon double bonds can be hydrogenated until at least about 70 % of the aliphatic unsaturation has been saturated.

Alternatively the amine terminated polymers may be prepared using a dilithium initiator such as described in U.S. Pat. No. 5,965,681, referenced above. For example, such polymers can be prepared by adding two (2) equivalents of at least one lithium initiator or a mixture of lithium initiators, such as sec-butyllithium, to at least one or a mixture of compounds having at least two independently polymerizable vinyl groups, such as 1,3-divinylbenzene or 1,3-diisopropenylbenzene, to form a dilithium initiator having a central core formed of the compounds(s) having polymerizable vinyl groups. Thereafter at least one monomer selected from the group consisting of conjugated dienes, alkenylsubstituted aromatic hydrocarbons, and mixtures thereof, is added to grow or polymerize polymer arms having living ends from the central core. The living chain ends are functionalized by adding two equivalents of at least one or a mixture of functionalizing agents (electrophiles), which can have the following structure:

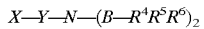

wherein X, Y, B, $R^4$, $R^5$, and $R^6$ are as defined above.

Examples of suitable conjugated alkadienes include, but are not limited to, 1,3-butadiene, isoprene, 2,3-dimethyl-1,3-butadiene, 1,3-pentadiene, myrcene, 2-methyl-3ethyl-1,3-butadiene, 2-methyl-3-ethyl-1,3-pentadiene, 1,3-hexadiene, 2-methyl-1,3-hexadiene, 1,3-heptadiene, 3-methyl-1,3-heptadiene, 1,3-octadiene, 3-butyl-1,3-octadiene, 3,4diethyl-1,3-hexadiene, 3-n-propyl-1,3-pentadiene, 4,5-diethyl-1,3-octadiene, 2,4diethyl-1,3-butadiene, 2,3di-n-propyl-1,3-butadiene, and 2-methyl-3-isopropyl-1,3-butadiene.

Examples of polynerizable alkenylsubstituted aromatic hydrocarbons include, but are not limited to, styrene, alpha-methylstyrene, vinyltoluene, 2-vinylpyridine, 4-vinylpyridine, 1-vinylnaphthalene, 2-vinylnaphthalene, 1-alpha-methylvinylnaphthalene, 2-alpha-methylvinylnaphthalene, 1,2-diphenyl-4-methyl-1-hexene and mixtures of these, as well as alkyl, cycloalkyl, aryl, alkylaryl and arylalkyl derivatives thereof in which the total number of carbon atoms in the combined hydrocarbon constituents is generally not greater than 18. Examples of these latter compounds include 3-methylstyrene, 3,5-diethylstyrene, 4-tert-butylstyrene, 2-ethyl-4-benzylstyrene, 4phenylstyrene, 4-p-tolylstyrene, 2,4 divinyltoluene and 4,5-dimethyl-1-vinylnaphthalene. U.S. Pat. No. 3,377,404, incorporated herein by reference in its entirety, discloses suitable additional alkenylsubstituted aromatic compounds.

Examples of methods to hydrogenate the polymers of this invention are described in Falk, *Journal of Polymer Science: Part A-1*, vol. 9, 2617–2623 (1971), Falk, *Die Angewandte Chemie*, 21, 17–23 (1972), U.S. Pat. Nos. 4,970,254, 5,166,277, 5,393,843, 5,496,898, and 5,717,035. The hydrogenation of the functionalized polymer is conducted in situ, or in a suitable solvent, such as hexane, cyclohexane or heptane. This solution is contacted with hydrogen gas in the presence of a catalyst, such as a nickel catalyst. The hydrogenation is typically performed at temperatures from 25° C. to 150° C., with a archetypal hydrogen pressure of 15 psig to 1000 psig. The progress of this hydrogenation can be monitored by InfraRed (IR) spectroscopy or Nuclear Magnetic Resonance (NMR) spectroscopy. The hydrogenation reaction is conducted until at least about 70% of the aliphatic unsaturation has been saturated. The hydrogenated functional polymer is then recovered by conventional procedures, such as removal of the catalyst with aqueous acid wash, followed by solvent removal or precipitation of the polymer.

The polymerization is preferably conducted in a non-polar solvent such as a hydrocarbon, since anionic polymerization in the presence of such non-polar solvents is known to produce polyenes with high 1,4-contents from 1,3-dienes. Inert hydrocarbon solvents useful in practicing this invention include but are not limited to inert liquid alkanes, cycloalkanes and aromatic solvents and mixtures thereof. Exemplary alkanes and cycloalkanes include those containing five to 10 carbon atoms, such as pentane, hexane, cyclohexane, methylcyclohexane, heptane, methylcycloheptane, octane, decane and the like and mixtures thereof. Exemplary aryl solvents include those containing six to ten carbon atoms, such as toluene, ethylbenzene, p-xylene, m-xylene, o-xylene, n-propylbenzene, isopropylbenzene, n-butylbenzene, and the like and mixtures thereof.

Polar solvents (modifiers) can be added to the polymerization reaction to alter the microstructure of the resulting polymer, i.e., increase the proportion of 1,2 (vinyl) microstructure or to promote functionalization or randomization. Examples of polar modifiers include, but are not limited to: diethyl ether, dibutyl ether, tetrahydrofuran (THF), 2-methyltetrahydrofuran, methyl tert-butyl ether (MTBE), diazabicyclo[2,2,2]octane (DABCO), triethylamine, tri-n-butylamine, N,N,N',N'-tetramethylethylenediamine (TMEDA), and 1,2dimethoxyethane (glyme). The amount of the polar modifier added depends on the vinyl content desired, the nature of the monomer, the temperature of the polymerization, and the identity of the polar modifier.

The resultant amine terminated polyolefin can be generally represented by the formula

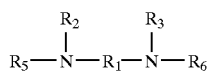

(III)

wherein $R_1$ is a polyolefin, and $R_2$, $R_3$, $R_5$, and $R_6$ are each independently H or substituted or unsubstituted C1–C25 alkyl. Preferably $R_2$ and $R_5$ are not both hydrogen and $R_3$ and $R_6$ are not both hydrogen. The amine function is preferably secondary to produce the adducts of the invention because primary amines have an additional reactive hydrogen that can react with the polyfunctional acrylate and cross link the same.

The telechelic amine functional polymer is preferably a hydrogenated polybutadiene, a hydrogenated polyisoprene, or a hydrogenated copolymer of butadiene and isoprene. Preferably, at least about 70%, more preferably at least about 90%, and most preferably up to about 98% of the unsaturated carbon-carbon double bonds in the polymers or copolymers are hydrogenated.

The molecular weight of the amine functional polymer can range from about 1000 to about 200,000, preferably from about 1500 to about 20,000, and more preferably from about 3000 to about 5000. There should be sufficient pendent vinyl groups in the polybutadiene to prevent crystallization of the polymer upon hydrogenation. Preferably, the functionality of the amine terminated polyolefin is from about 1.5 to about 2.0 amine groups per chain.

The polyfunctional acrylates can be any suitable acrylate having two or more acrylate functionalities and capable of reacting with the amine-terminated polyolefins via Michael addition. Such acrylates are known in the art and can be generally described as having the formula

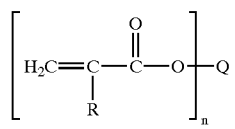

wherein R is hydrogen or methyl, n is $\geq 2$ and Q is an organic group. Preferably n is 2–5, more preferably 2–4 and most preferably 2. It is expected that Q can be any organic group that does not interfere with the Michael addition reaction between the reactive amine of the polybutadiene and the acrylate component. Typical Q groups include without limitation polyoxyalkylenes or polyethers, and aliphatic, aromatic and alicyclic groups, and further can include other functionalities, such as epoxy, urethane, polyester, and isocycanate groups as known in the art.

Examples of polyoxyalkylene polyacrylate compounds include, but are not limited to, 1,6-hexanediol diacrylate, 1,4-butanediol diacrylate, ethylene glycol diacrylate, diethylene glycol diacrylate, triethylene glycol diacrylate, tetraethylene glycol diacrylate, tripropylene glycol diacrylate, neopentyl glycol diacrylate, polyethylene glycol diacrylate, 1,3-butylene glycol diacrylate, triisopropylene glycol diacrylate, trimethylolpropane triacrylate, pentaerythritrol monohydroxy triacrylate, trimethylolpropane triethoxy triacrylate, pentaerythritol tetraacrylate, di-trimethylol propane tetraacryl ate, and dipentaerythritol (monohydroxy) pentaacrylate, ethoxylated neopentyl glycol diacrylate, propoxylated neopentyl glycol diacrylate, and the like and mixtures thereof.

Other multifunctional acrylate compounds can participate in the Michael addition reaction. These include, but are not limited to, ethoxylated bisphenol A diacrylate, bisphenol A epoxy diacrylate, hexafunctional aromatic urethane acrylate (Ebecryl 220 from UBC Radcure), aliphatic urethane diacrylate (Ebecryl 230 from UBC Radcure), tetrafunctional polyester acrylate (Ebecryl 80 from UBC Radcure), tris (2-hydroxy-ethyl)isocyanurate triacrylate, polyether diacrylates, and the like.

The reaction of the amine functional polymers and the polyfunctional acrylates readily occurs at or around room temperature (e.g. 20° to 25° C.) but the rate of reaction can be increased at elevated temperatures (e.g. up to 100° C.). It may be desirable to use diluents or solvents such as acetone, benzyl alcohol or other polar solvents, to produce the adducts of the invention. In addition, a base can be used to catalyze the reaction. However, a large molar excess (up to 5×) of one reactant or the other allows the adducting to be done with ease.

The amine functional polymers as prepared above are reacted with polyoxyalkylene polyacrylates, or other polyfunctional acrylates (having a functionality of about 2.0 or more), by Michael addition to yield acrylic terminated polymers:

MICHAEL ADDITION POLYOLFIMN DIAMINE
POLYOXYALKYLENE DIACRYLATE
ADDUCTS

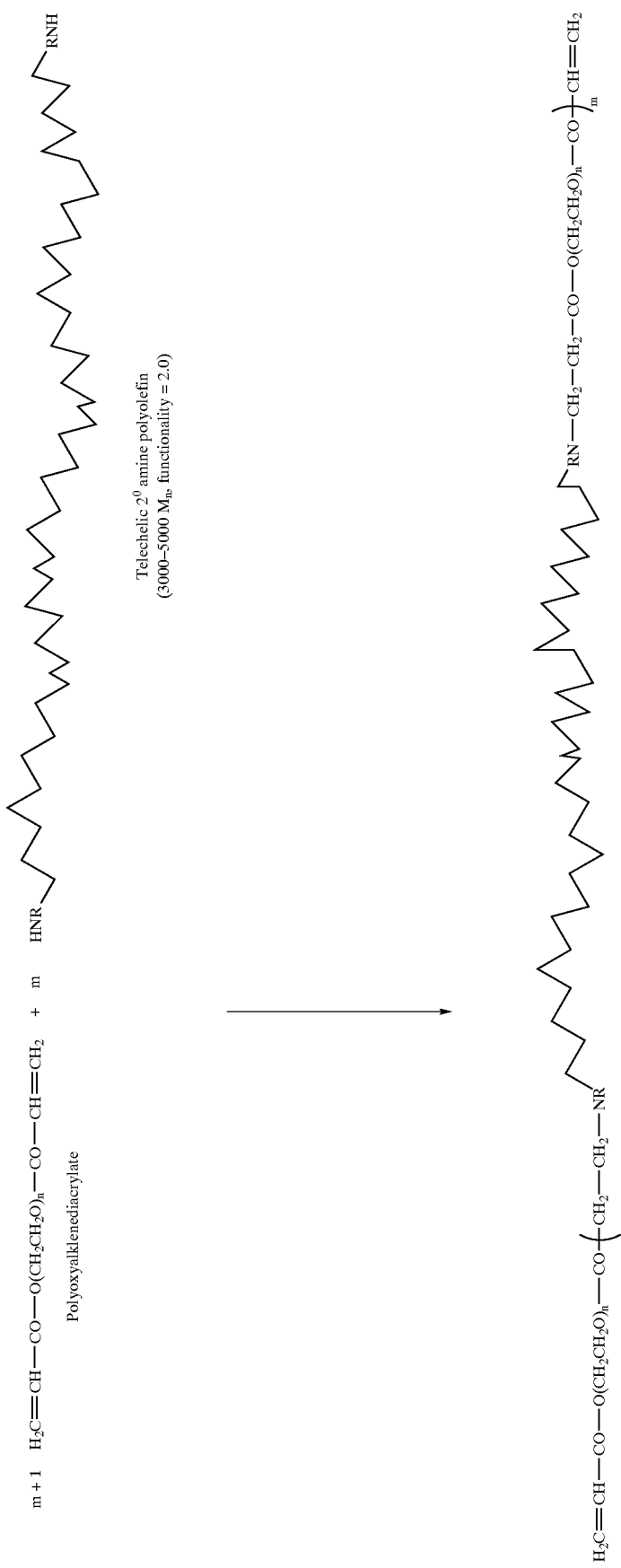

Terminal Acrylic Functional Polyolefin Diamine Polyoxyalkylene Adduct

To insure that no undesirable polymerization takes place during the Michael addition reaction, free-radical polymerization inhibitors may be added to the reaction mixture. Suitable polymerization inhibitors include substituted phenols, such as 2,6-di-tert-butyl-p-cresol, hydroquinones, such as the monomethyl ether of hydroquinone (MEHQ), and thio ethers, such as thiodiglycol or phenothiazine.

The reaction can be carried out as above to give elastomeric like polymers useful for adhesives, sealants, cable fillers, scalers, water-stop materials, and other civil engineering/construction (CECON) applications.

Alternatively, the reactive mixtures can include the amine functional adducts as well as small molecule secondary or primary polyamines, the latter having an additional reactive hydrogen that can react with an additional polyfunctional acrylate to cure the adduct. Other acrylic monomers can also be included to participate in free radical polymerization with the acrylic functional terminal groups on the Michael addition product by methods known in the art. Such Michael addition products can also participate with added acrylic monomers in photopolymerization (UV or e-beam) radiation or cationic cure systems by methods known in the art. The resultant polymers are binders for 100 % reactive systems, representing clean chemistries at or near zero VOC requirements for coatings, electronics, adhesive, and other low VOC applications.

The tertiary amine groups resulting from the Michael addition products can be quaternized by acidification by methods known in the art, enabling dispersion in water-based cathodic electrodeposition coating systems.

For examples of the use of Michael addition reaction products in coatings, adhesives and other applications, see U.S. Pat. Nos. 4,070,258; 4,373,008; 4,837,295; 5,453,449; 5,536,775; 5,626,964; 5,648,173; 5,739,172; and 5,840,428.

The following non-limiting examples illustrate the present invention.

EXAMPLE 1

Preparation of Michael Addition Adduct of Di-Amine Functional Polyolefin With an Urethane Diacrylate Monomer (Resin A)

A Michael Addition adduct of a di-amine functional polyolefin with an urethane diacrylate monomer is prepared using the following:

| Ingredients | Parts by Weight (grams) |
|---|---|
| Ebecryl 270[1] | 800 |
| DSA-PEB-50[2] | 350 |
| Monoethylether of hydroquinone (MEHQ) | 0.10 |

[1]Aliphatic urethane diacrylate with a molecular weight of 1500, commercially available from UCB Radcure, Inc., Smyrna, GA.
[2]Di-sec-amine functional poly-ethylene-butylene, with a number average molecular weight of 3500, prepared as described in the specification from the polymerization of butadiene, using a protected secondary amine functional lithium initiator, followed by reaction with a sec-amine functional electrophile and then hydrogenation. The polymer butylene content is preferably in the range of 30–70%, but the range could be 10–90% of butylene content in the microstructure. The polymer has an amine functionality of about 1.9.

800 grams of Ebecryl 270 aliphatic urethane diacrylate and 0.1 grams of MEHQ are mixed in a suitable reaction vessel with a mechanical stirrer under nitrogen atmosphere. 350 grams of the DSA-PEB-50 di-sec-amine functional polyolefin are added to the vessel, under a nitrogen atmosphere, with stirring, and the mixture is gradually heated to 70° C. The reaction mixture is maintained at this temperature for three hours. The resulting product is a mixture of diacrylate functional polyolefin and aliphatic urethane diacrylate.

EXAMPLE 2

Preparation of Michael Addition Adduct of Di-Amine Functional Polyolefin With an Epoxy Diacrylate Monomer (Resin B)

A Michael addition adduct of a di-amine functional polyolefin with an epoxy diacrylate 5 monomer (Resin B) is prepared using the following:

| Ingredients | Parts by Weight (grams) |
|---|---|
| Ebecryl 600[1] | 250 |
| DSA-PEB-50[2] | 350 |
| Monoethylether of hydroquinone (MEHQ) | 0.10 |

[1]A bisphenol A epoxy diacrylate with a molecular weight of 500, commercially available from UCB Radcure, Inc., Smyrna, GA.
[2]Di-sec-amine functional poly-ethylene-butylene, with a number average molecular weight of 3500, prepared as described in the specification from the polymerization of butadiene, using a protected secondary amine functional lithium initiator, followed by reaction with a sec-amine functional electrophile and then hydrogenation. The polymer butylene content is preferably in the range of 30–70%, but the range could be 10–90% of butylene content in the microstructure. The polymer has an amine functionality of about 1.9.

250 grams of Ebecryl 600 epoxy diacrylate and 0.1 grams of MEHQ are mixed in a suitable reaction vessel with a mechanical stirrer under nitrogen atmosphere. 350 grams of the DSA-PEB-50 di-sec-amine functional polyolefin are added to the vessel, under a nitrogen atmosphere, with stirring, and the mixture is gradually heated to 65° C. The reaction mixture is maintained at this temperature for 12 hours. The resulting product is a mixture of diacrylate functional polyolefin and epoxy diacrylate.

EXAMPLE 3

Preparation of a Michael Addition Adduct of Di-Amine Functional Polyolefin With a Triacrylate Monomer (Resin C)

A Michael addition adduct of a di-arine functional polyolefin with a triacrylate monomer (Resin C) is prepared using the following:

| Ingredients | Parts by Weight (grams) |
| --- | --- |
| SR-454[1] | 350 |
| DSA-PEB-50[2] | 350 |
| Monoethylether of hydroquinone (MEHQ) | 0.10 |

[1]SR-454, 3-mole ethoxylated trimethylolpropane triacrylate, with a molecular weight of 678, commercially available from Sartomer Division of Total Fina, Exton, PA, U.S.A.
[2]Di-sec-amine functional poly-ethylene-butylene, with a number average molecular weight of 3500, prepared as described in the specification from the polymerization of butadiene, using protected secondary amine functional lithium initiator, followed by reaction with a sec-amine functional electrophile and then hydrogenation. The polymer butylene content is preferably in the range of 30–70%, but the range could be 10–90% of butylene content in the microstructure. The polymer has an amine functionality of about 1.9.

350 grams of SR454 ethoxylated trimethylolpropane triacrylate and 0.1 grams of MEHQ are mixed in a suitable reaction vessel with a mechanical stirrer under nitrogen atmosphere. 350 grams of the DSA-PEB-50 di-sec-amine functional polyolefin are added to the vessel, under a nitrogen atmosphere, with stirring, and the mixture is gradually heated to 70° C. The reaction mixture is maintained at this temperature for twelve hours. The resultant product is a mixture of polyacrylate functional polyolefin and ethoxylated trimethylolpropane triacrylate.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed:

1. An adduct of a polyfunctional acrylate and an amine terminated polyolefin having the formula:

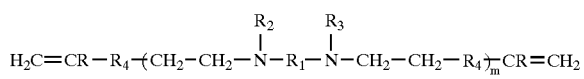

(I)

wherein:
 R is hydrogen or methyl;
 $R_1$ is a polyolefin;
 $R_2$ and $R_3$ are independently H or substituted or unsubstituted C1–C25 alkyl;
 $R_4$ is an organic group derived from a polyfinctional acrylate and optionally includes side groups formed by the reaction of vinyl groups and amine terminated polyolefins; and
 m is from 1 to 30.

2. The adduct according to claim 1, wherein $R_4$ is —C(O)—Q, wherein Q is an organic group comprising at least one moiety selected from the group consisting of polyethers, urethanes, epoxies, polyesters, and isocyanates.

3. The adduct according to claim 1, wherein the polyfunctional acrylate is a polyoxyalkylene acrylate.

4. The adduct according to claim 1, wherein $R_1$ is derived from an amine terminated polyolefin in which at least about 70% of the unsaturated carbon-carbon double bonds are hydrogenated.

5. The adduct according to claim 1, wherein $R_1$ is a hydrogenated polybutadiene or a hydrogenated polyisoprene.

6. The adduct according to claim 1, wherein $R_2$ and $R_3$ are both hydrogen.

7. The adduct according to claim 1, wherein the adduct is the reaction product of a polyfunctional acrylate and an amine terminated polymer having the formula III:

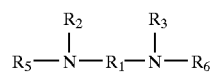

(III)

wherein $R_1$ is a polyolefin, and $R_2$, $R_3$, $R_5$, and $R_6$, are each independently H or substituted or unsubstituted C1–C25 alkyl.

8. The adduct according to claim 7, wherein $R_2$ and $R_5$ are not both hydrogen and $R_3$ and $R_6$ are not both hydrogen.

9. The adduct according to claim 7, wherein $R_5$ and $R_6$ are H.

10. The adduct according to claim 1, wherein the adduct is the reaction product of an amine terminated polymer and a polyfunctional acrylate selected from the group consisting of 1,6-hexanediol diacrylate, 1,4-butanediol diacrylate, ethylene glycol diacrylate, diethylene glycol diacrylate, triethylene glycol diacrylate, tetraethylene glycol diacrylate, tripropylene glycol diacrylate, neopentyl glycol diacrylate, polyethylene glycol diacrylate, 1,3-butylene glycol diacrylate, trilsopropylene glycol diacrylate, trimethylolpropane triacrylate, pentaerythritol monohydroxy triacrylate, trimethylolpropane triethoxy triacrylate, pentaerythritol tetraacrylate, di-trimethylol propane tetraacrylate, dipentaerythritol (monohydroxy) pentaacrylate, ethoxylated neopentyl glycol diacrylate, propoxylated neopentyl glycol diacrylate, ethoxylated bisphenol A diacrylate, bisphenol A epoxy diacrylate, hexafiunctional aromatic urethane acrylate, aliphatic urethane diacrylate, tetrafuinctional polyester acrylate, tris (2-hydroxy-ethyl)isocyanurate triacrylate, and polyether diacrylates.

11. The adduct according to claim 10, wherein the polyfunctional acrylate is a polyoxyalkylenediacrylate.

12. A quaternized adduct of a polyfunctional acrylate and an amine terminated polyolefin wherein said adduct before quaternization has the formula (I)

$$H_2C=CR-R_4-(CH_2-CH_2-\underset{|}{N}-R_1-\underset{|}{N}-CH_2-CH_2-R_4)_m CR=CH_2$$

wherein:
 R is hydrogen or methyl;
 $R_1$ is a polyolefin;
 $R_2$ and $R_3$ are independently H or substituted or unsubstituted C1–C25 alkyl;
 $R_4$ is an organic group derived from a polyfunctional acrylate and optionally includes side groups formed by the reaction of vinyl groups and amine terminated polyolefins; and
 m is from 1 to 30.

* * * * *

UNITED STATES PATENT AND TRADEMARK OFFICE
CERTIFICATE OF CORRECTION

PATENT NO. : 6,706,821 B1
DATED : March 16, 2004
INVENTOR(S) : Letchford

It is certified that error appears in the above-identified patent and that said Letters Patent is hereby corrected as shown below:

Column 6,
Line 35, should read -- Examples of polymerizable alkenylsubstituted aromatic --

Column 9,
The structure should read -- Polyoxyalkylenediacrylate --

Column 11,
Line 49, should read -- Diacrylate Monomer (Resin A) --

Column 12,
Line 25, should read -- Amine Functional Polyolefin With an Epoxy --
Line 65, should read -- A Michael addition adduct of a di-amine functional poly- --

Column 13,
Line 53, should read -- $R_4$ is an organic group derived from a polyfunctional --

Column 14,
Line 32, should read -- diacrylate, triisopropyleme glycol diacrylate, trimethylolpro- --
Lines 39-40, should read -- epoxy diacrylate, hexafunctional aromatic urethane acrylate, aliphatic urethane diacrylate, tetrafunctional poly- --

Signed and Sealed this

Twenty-third Day of November, 2004

JON W. DUDAS
*Director of the United States Patent and Trademark Office*